US005789842A

United States Patent [19]

Steinbach et al.

[11] Patent Number: 5,789,842

[45] Date of Patent: Aug. 4, 1998

[54] ALTERNATOR RINGS AND CYLINDRICAL COMMUTATORS MADE OF A SINTERED COPPER-GRAPHITE COMPOSITE MATERIAL

[75] Inventors: Friedemann Steinbach; Eric Kammerer, both of Amiens; Michel Carrouaille, Vignacourt, all of France

[73] Assignee: Le Carbone Lorraine, Courbevoie, France

[21] Appl. No.: 652,274

[22] Filed: May 22, 1996

[30] Foreign Application Priority Data

May 22, 1995 [FR] France .................................. 95 06334

[51] Int. Cl.$^{6}$ .................................................. H02K 13/00

[52] U.S. Cl. ........................................... 310/233; 310/231

[58] Field of Search ................................... 310/231, 232, 310/233, 234, 235, 236, 237, 337

[56] References Cited

U.S. PATENT DOCUMENTS

| | | | |
|---|---|---|---|
| 2,758,229 | 8/1956 | Perry | 310/231 |
| 4,349,384 | 9/1982 | Weinert | 310/233 |
| 4,358,319 | 11/1982 | Yoshida et al. | 75/200 |
| 4,399,383 | 8/1983 | Kamiyama | 310/233 |
| 4,799,957 | 1/1989 | Vogel | 252/502 |
| 5,369,326 | 11/1994 | Strobl | 310/235 |
| 5,386,167 | 1/1995 | Strobl | 310/237 |
| 5,552,652 | 9/1996 | Shimoyama et al. | 310/237 |

FOREIGN PATENT DOCUMENTS

| | | |
|---|---|---|
| 3230298 | 3/1983 | Germany . |
| A 2-136051 | 8/1990 | Japan . |
| 2 086 666 | 5/1982 | United Kingdom . |

*Primary Examiner*—Clayton E. Laballe

*Attorney, Agent, or Firm*—Oblon, Spivak, McClelland, Maier & Neustadt, P. C.

[57] ABSTRACT

The invention relates to a rotating element of an electrical machine, rotating electrical contact parts and electrical machines containing these devices.

25 Claims, 5 Drawing Sheets

ALTERNATOR RINGS AND CYLINDRICAL COMMUTATORS MADE OF A SINTERED COPPER-GRAPHITE COMPOSITE MATERIAL

SCOPE OF THE INVENTION

This invention concerns the sliding electrical contacts of electrical machines, such as motors and alternators. The invention concerns more specifically the rotating contact parts of the aforesaid sliding electrical contacts, such as the alternator rings or cylindrical commutators of electric motors.

The aforesaid parts are fastened to the rotating element of the electrical machine, generally to one of its ends, and are swept by one or several brushes so as to establish a sliding electrical contact and to cause the current to flow between the electrical conductors which are joined to the rotating element and the fixed electrical conductors. The brushes generally comprise a wear part to which is fastened a connecting electrical conductor.

The invention concerns particularly the rotating contact parts made of a copper-graphite composite material designed to be used in combination with the brushes containing carbonaceous materials.

PRIOR ART

According to prior art, the rotating contact part, which generally has a usable thickness clearly thinner than the usable length of the wear part of the brush, consists of a material possessing high electrical conductivity and mechanical characteristics sufficient, in particular, to avoid breaking up during rotation. The wear part of the brush most often consists of a conductive material which is softer than the rotating contact part and offers satisfactory tribological behavior and electrical contact properties so as to prevent quick wear of the sliding contact and to develop a small voltage drop between the brush and the rotating contact part.

Making rotating contact parts out of copper alloys such as slightly alloyed copper or bronze, is well known, as is making the wear parts of the brushes out of a material containing a carbonaceous material, such as amorphous carbon and natural or synthetic graphite.

The rotating contact parts made of a copper alloy are most often obtained by drawing or stamping, and the hardening caused by the plastic deformations makes it possible to obtain sufficient mechanical characteristics in the finished product.

The use of rotating contact parts made of graphite for the construction of motors designed to operate in submersion in media aggressive to copper, such as certain gasolines of automotive vehicles, is also known.

In order to obtain a mechanical strength of the rotating contact part greater than that of a graphite rotating contact part, making the aforesaid parts out of a metal-graphite composite, particularly from a mixture of bronze or copper powders and graphite compacted by sintering, is known from German Patent Application No. DE 3,230,298. This approach has not yielded any known application to the sliding electrical contacts of electrical machines.

Using brushes in which the wear part is a metal-graphite composite is known, the composite generally being obtained by incomplete sintering of the metallic phase or by impregnation with a percentage of copper most often lower than 85%.

PROBLEM POSED

The reliability of an electrical machine is a criterion which takes on growing importance in the choice of a technical solution. This criterion becomes decisive when an electrical machine is used or designed to be part of an assembly, often complex, such as an electrical device or automobile vehicle, since premature failure of one of the components of the whole reduces the reliability of the unit as a whole and entails additional maintenance costs.

The reliability criterion is expressed particularly in a life-span that corresponds to the length of time the machine operates without maintenance and without monitoring until the first failure occurs, leading to a shutdown and requiring intervention.

Thus, the life-span of electrical machines is often limited by the wear of the sliding electrical contacts. In current applications based on the use of known materials, the known life-spans are at the most on the order of 1,500 h.

However, although such life-spans are entirely satisfactory for a large number of applications, certain fields, such as those of automobile vehicles, increasingly require life-spans clearly greater than 1,500 h.

OBJECT OF THE INVENTION

The main object of this invention is a rotating contact part made of a graphite-copper composite, the rate of wear of which in combination with brushes, containing a carbonaceous material, leads to life-spans clearly greater than 1,500 h.

DESCRIPTION OF THE INVENTION

According to the invention, the rotating contact part, such as a ring or cylindrical commutator, intended for use in the rotating element of an electrical machine, such as a motor or alternator, consists of a sintered copper-graphite composite material and is characterized by the fact that the aforesaid composite material is between 90 and 98% copper or copper alloy by weight, by the fact that the effective specific gravity of the aforesaid composite material ranges between 6.5 and 8.5 and by the fact that the flakes of graphite are strongly oriented with respect to the axis of symmetry of the aforesaid rotating contact part, i.e., the principal axis P of more than 50% of the graphite flakes is inclined less than 45° with respect to the aforesaid axis of symmetry in such a way that the anisotropy of the resistivity and the bending strength is very pronounced, i.e., the ratio Rho of resistivity Rho $\parallel$/Rho $\perp$ is greater than 1.2 and the ratio R of bending strength R $\parallel$/R $\perp$ is less than 0.8, where $\parallel$ refers to the direction parallel to the aforesaid axis of symmetry and $\perp$ to the perpendicular direction.

The axis of symmetry of the rotating contact part corresponds to the axis of rotation of the rotating element of the electrical machine.

The main axis P of the graphite flakes, which is approximately perpendicular to the apparent plane of the flakes, corresponds to the average orientation of the crystallographic c axes which are perpendicular to the base planes of the graphite particles of the flakes.

Preferably, the particles of the graphite flakes have a maximum size of less than 200 μm and at least 90% of the aforesaid particles have a maximum size of less than 100 μm. Larger particles entail too high a number of defects and excessively large internal mechanical constraints.

Preferably, the connection of the rotating contact parts to the electrical conductors of the rotating element is achieved by the aid of one or several electrical connection conductors fastened to the contact parts. The connection conductors may be of any known conductive material, such as copper and its alloys or aluminum and its alloys.

According to one variation of the invention, the contact parts, to which one or several connection conductors are advantageously fastened, form a separate assembly which may be individually manufactured and then fastened to the shaft of the rotating element. This assembly is preferably held by a support part made of an insulating material, such as a possibly charged polymer resin, which makes it possible to provide a satisfactory positioning of the contact parts in relation to one another and in relation to the axis of rotation.

The applicant was surprised to discover that, as shown by the examples, the rotating contact part according to the invention leads to life-spans of the sliding contact clearly higher than those of prior art.

This fact has no known explanation and, in fact, goes against the usual teaching of prior art, especially with regard to the mechanical characteristics of the materials. The increase in life-span could be linked to a modification of the tribological mechanisms under an electric current and to electrical phenomena at the contact.

The rotating contact parts according to the invention present the advantages of replacing the components of prior art without a major modification of the electrical machines and of producing lower contact voltage drops, less vibration, a lower sound level and less electromagnetic interference, and allowing easy electrical connections with the electrical conductors according to the known techniques, such as soldering or sealing.

The second object of the present invention is an economical manufacturing process of the rotating contact part of the first object of the invention.

The invention procedure comprises the following stages:

preparation of a mixture of graphite powder, copper or copper-alloy powder and at least one solid lubricant, formation of a raw casting by cold axial compression of the mixture in a mold, in such a way that the axis of compression coincides with the axis of symmetry of the aforesaid part, sintering of the raw casting under a reducing atmosphere.

Preferably, the particles of the graphite flakes have a maximum size of less than 200 μm and at least 90% of the aforesaid particles have a maximum size of less than 100 μm. Preferably, the maximum dimension of the particles of copper powder is near that of the graphite particles and less than 200 μm, and at least 90% of the copper particles have a maximum size of less than 100 μm. Graphite and copper particle sizes that are too different entail in particular a drop in mechanical characteristics and greater porosity. Copper particles whose size is too great lead to a number of unacceptable defects and significant mechanical constraints.

The particles of the aforesaid copper-based powder preferably have an irregular surface morphology, i.e., a dendritic or similar structure, such as that obtained electrolytically.

It may be advantageous to use copper of an electrolytic origin.

The solid lubricant(s) of the mixture is (are) chosen from among known solid lubricants, such as stearates.

The proportion of solid lubricant is preferably less than 5% by weight so as to ensure a satisfactory lubrication when shaping without, however, leaving too great a porosity at the time of sintering.

The compression pressure is preferably between 150 and 350 MPa so as to ensure sufficient compression, without requiring difficult compression conditions.

The sintering temperature is preferably between 500° and 1,050° C. A temperature lower than 500° C. gives incomplete sintering and a temperature greater than 1,050° C. entails significant softening of the copper particles, if not their fusion, and leads in particular to heterogeneities in the distribution of the graphite particles. It is advantageous to perform the sintering operation at a temperature of between 700° and 900° C. for reasons of cost and speed. The length of time the sintering temperature is maintained is chosen, preferably, between 1 and 5 h so as to ensure complete sintering, while avoiding secondary recrystallization and the appearance of defects and stresses.

It may be advantageous to seal the electrical conductors in the rotating contact part at the time of the compression phase.

It is advantageous to fasten one or several electrical connection conductors to the rotating contact parts during the shaping stage of the raw casting. Preferably, the connection conductor is fastened by axial compression of the aforesaid mixture around the conductor.

According to an advantageous variation of the invention, after the forming stages of the raw castings and sintering according to the invention, the contact parts are assembled so as to form a separate rigid assembly, such as a commutator assembly, which may then be fastened to the shaft of the rotating element.

The manufacturing process of the invention offers the advantage of not requiring the addition of organic binders or metals. The procedure according to the invention likewise offers the advantage of producing rotating contact parts in the desired dimensions or only requiring simple additional machining.

DESCRIPTION OF THE FIGURES

The invention will be better understood with the help of the following figures, which are given by way of illustration and are not restrictive.

FIG. 2 *b*) schematically illustrates the rotating element (1) of an alternator revolving about an axis of rotation (4). The sliding electrical contact includes brushes, of which only the wear parts (3) are represented, and rings (7).

Figure 1:
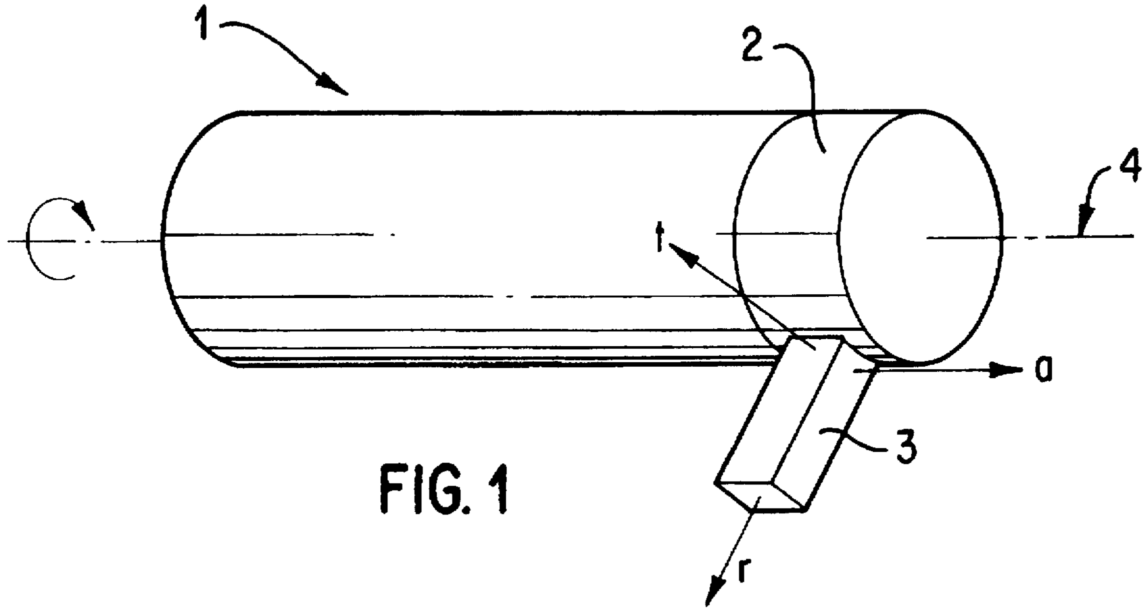
FIG. 1 illustrates schematically the configuration of a sliding electrical contact of an electrical machine, with the rotating element (1), at least one rotating contact part (2) and at least one brush, of which only the wear part (3) is represented without the holding system. The axis of rotation (4) of the rotating element coincides here with the axis of symmetry of the rotating contact part (2). The direction of rotation indicated is arbitrary. The directions t, a and r correspond respectively to the direction tangential to the rotating contact part, to the axial direction parallel to the axis of rotation and to the radial direction with respect to the same axis of rotation and with respect to the sliding electrical contact.
Figure 2A:
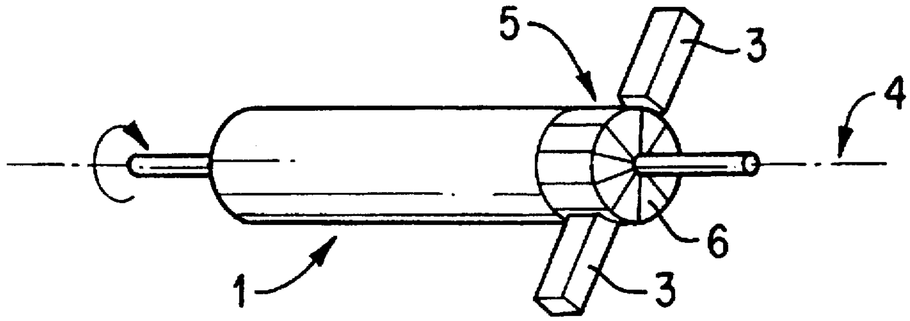
FIG. 2 *a*) schematically illustrates the rotating element (1) of an electric motor turning about an axis of rotation (4). The sliding electrical contact includes the brushes, of which only the wear parts (3) are shown, and a cylindrical commutator (5) including several bars (6).
Figure 2B:
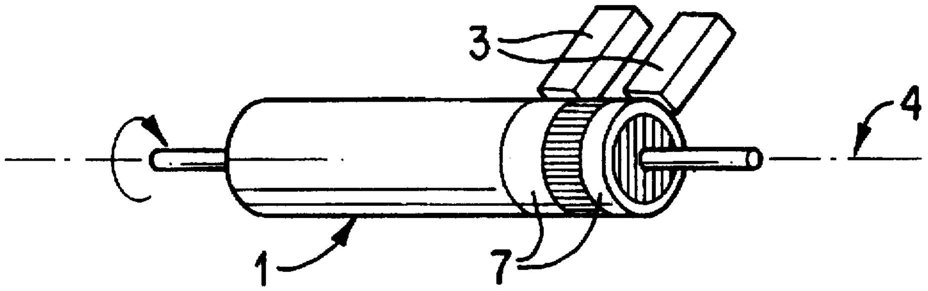
Figure 3:
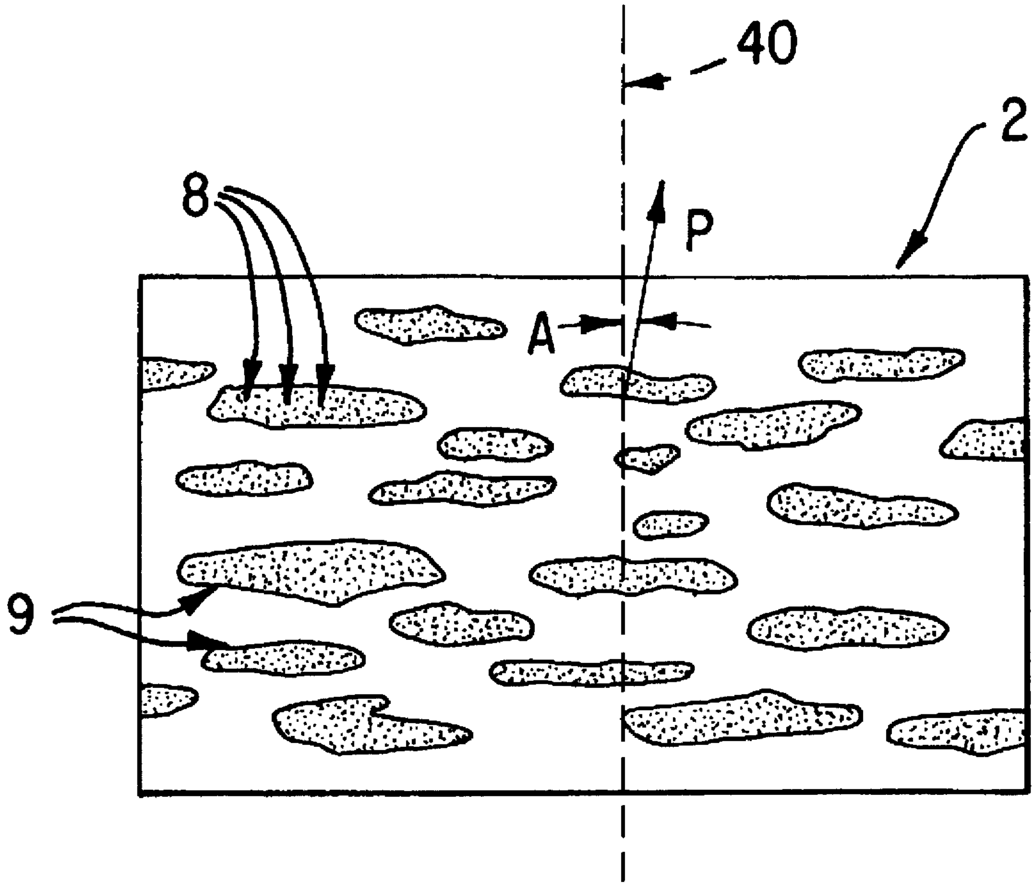
FIG. 3 illustrates schematically an axial section of one rotating contact part (2), which comprises flakes (9), consisting of graphite particles (8) and of which the main axis P is slanted at an angle A with respect to any axis (40) parallel to the axis of symmetry.

According to a first variation, a first stage comprises the formation of a number N of connection parts made of a conductive material (stage a). The mixture, according to the invention, is then compressed, according to the invention, around part of the connection part (stage b). After the sintering stage, the contact parts (15) equipped with the connection conductor (16) are assembled and held by a support piece made of an insulating material (17) (stage c). The contact parts are then separated electrically by any known means, such as by machining, so as to create the gap (18) necessary between the strips (stage d) and to obtain a finished part (20).

According to another variation, the first stage includes the shaping of an initial part including the connection conductors (stage a'). The mixture is then compressed, according to the invention, around a part of this part (stage b'). After the sintering stage, the support part (17) (stage c') is shaped and the contact parts are electrically separated from one another by a known means, such as by machining, so as to create the necessary gap (18) between the strips (stage d) and to obtain a final part (20). The operation of electrically separating the contact parts can be performed partly before the shaping stage of the support part.

EXAMPLES

Example 1

Rings for a 12V alternator have been made according to prior art and according to the invention.

Alternator rings according to prior art were made by machining tubular sections made of unannealed copper.

Rings according to the invention were made according to the procedure of the invention from electrolytic copper and natural graphite. The maximum dimensions of the copper and graphite particles were comparable and less than 200 μm and at least 90% of the particles had maximum sizes of less than 100 μm.

The solid lubricant was zinc stearate (around 0.4% by weight in all cases).

Figure 4:
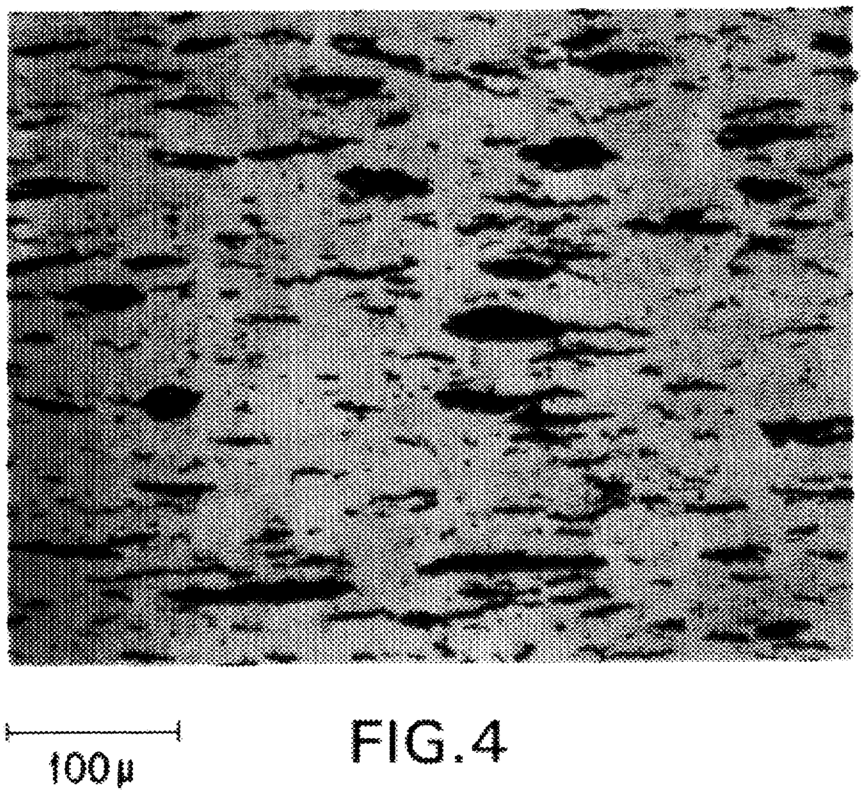
FIG. 4 shows a micrograph of an axial section of a rotating contact part according to the invention.
Figure 5:
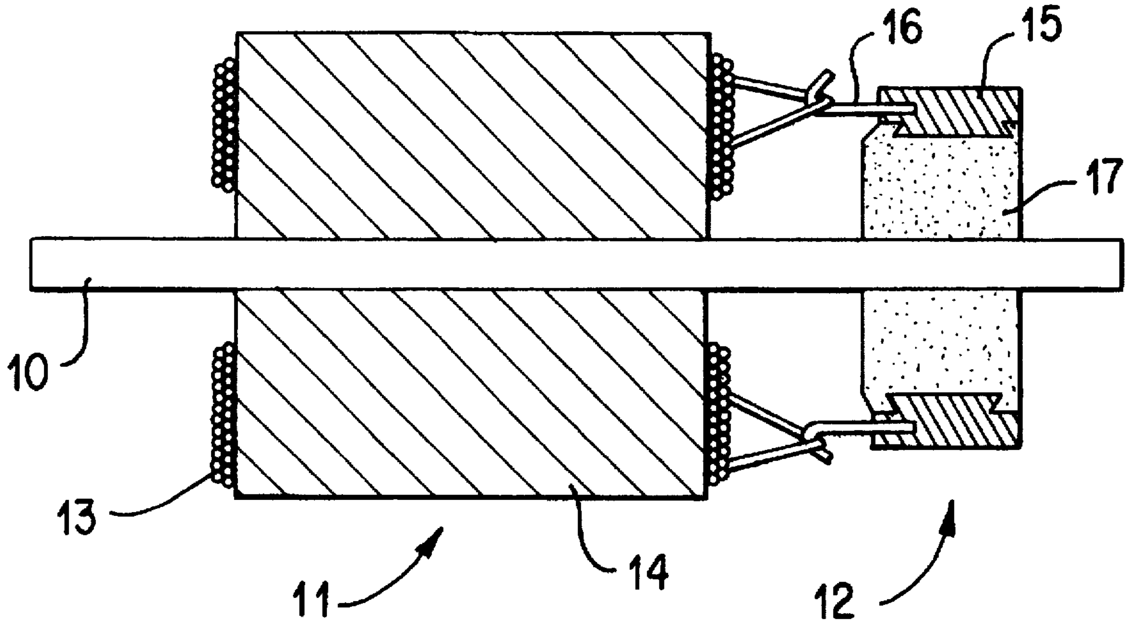
FIG. 5 schematically shows a longitudinal section of a rotating motor element, or rotor, said rotating element including a shaft (10), a drive armature (11) and a commutator assembly (12). The armature (11) includes a winding (13) and most often an iron piece made of bars (14). The commutator assembly (12) includes the bars (15) of the conductor, which constitute individual rotating contact parts, a conductor (16) for connection to the winding (13) and a support part (17) made of an insulating material. Only two connections to the winding are shown in order to simplify the illustration.
Figure 6:
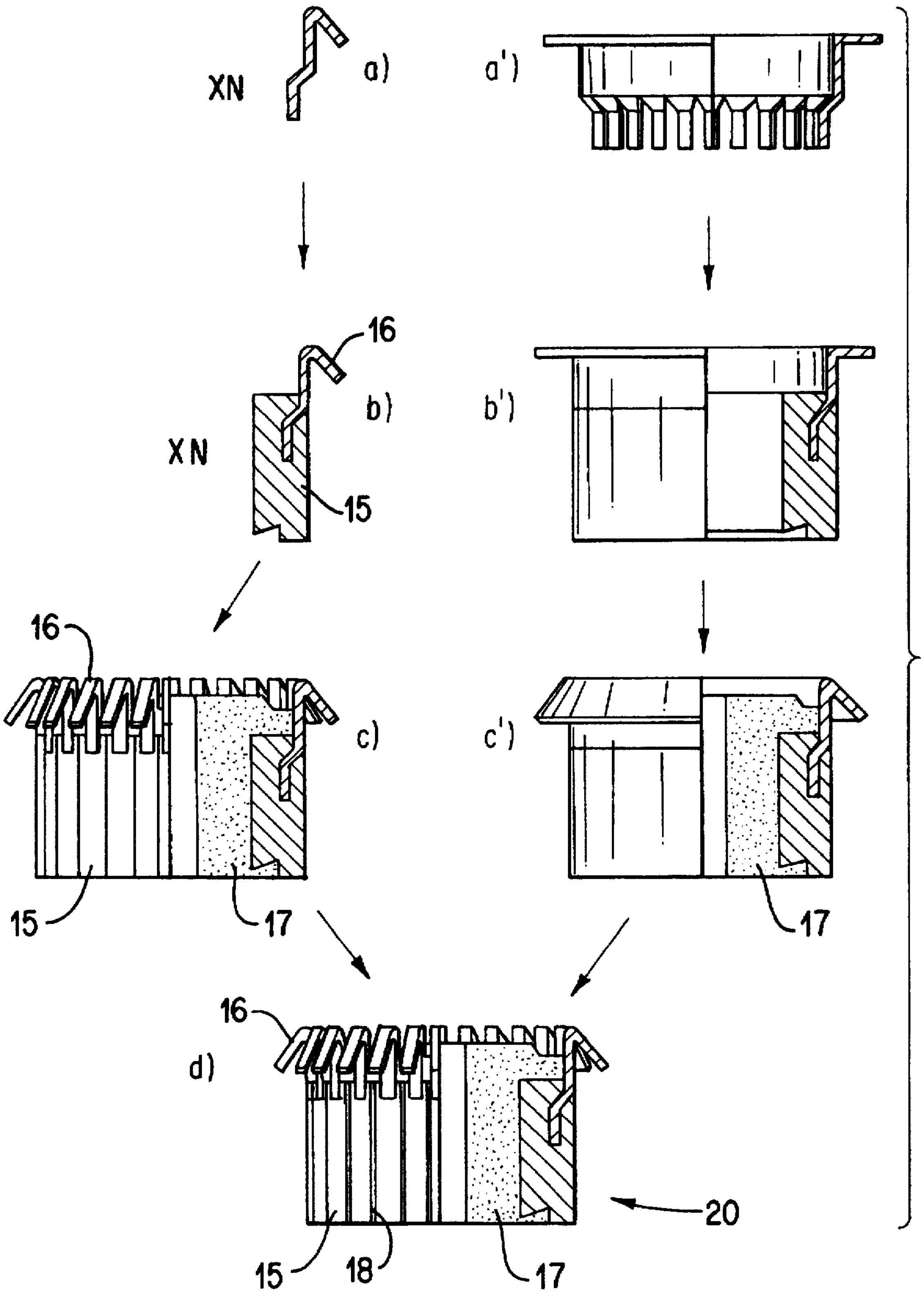
FIG. 6 illustrates, in a partial axial section, an embodiment of the manufacturing process according to the invention which makes it possible to obtain separate sets of contact parts (20) that can be assembled subsequently on rotating elements.

The electrolytic copper and natural graphite powders and the zinc stearate were mixed in different proportions according to the known techniques. Raw castings were shaped by axial compression of the mixture in a mold under a pressure of 195 MPa. The specific gravity of the raw castings was around 7.2. The raw castings were sintered at 850° C. for 3 h, after a rise in temperature at 50° C./h, in a reducing atmosphere including around 40% hydrogen and 60% nitrogen. A photomicroscopic section of one of the parts obtained is shown in FIG. 4.

Resistivity was measured according to the 4-point method. The bending strength was measured according to the 3-point method with samples of dimensions of 36 mm×20 mm×11.3 mm, with a gap of 27 mm between the two lower contact points.

The life-span tests were performed on a test bench under actual conditions of use. In all cases, the current was 3.5 A, the temperature 100° C., the rotating speed 10,000 rpm. The operation of the alternator was continuous during the trial.

The trials were performed with grade LCL C7364 metal-graphite brushes compressed along the radial direction r. The brushes had a cross section of 4.6 mm×6.4 mm and a usable length of 10 mm.

The results obtained are collected in Table I. D corresponds to specific gravity. %Cu and %C correspond respectively to the percentage by weight of copper and natural graphite in the sintered part. The life-span corresponds to the elapsed time from the time the alternator was started up and the first failure linked to complete wear of one of the brushes and/or one of the rings.

TABLE 1

| ① Cas | ② % Cu | ③ % C | ④ Rho | ⑤ R | ⑥ D | ⑦ Durée de via |
|---|---|---|---|---|---|---|
| 1- | 100 | 0 | 1,0 | >1 | 8,9 | 1510 h |
| 2- | 100 | 0 | 1,0 | 0,9 | 8,6 | 1480 h |
| 3- | 95 | 5 | 2,1 | 0,4 | 7,7 | 3050 h |
| 4- | 93 | 7 | 2,7 | 0,3 | 6.9 | 3100 h |
| 5- | 85 | 15 | 2,1 | 0,4 | 6,5 | 1220 h |

Key:
① Case
② % Cu
③ % C
④ Rho
⑤ R
⑥ D
⑦ Life-span

Case 1 concerns alternator rings made according to prior art. Cases 2 through 5 concern rings made by sintering according to the manufacturing process of the invention, with the percentages of copper and graphite corresponding to the invention in cases 3 and 4. Each case corresponds to 3 trials on different alternators.

These results show that the life-span is clearly greater than 1,500 h for the alternator rings of the invention.

Example 2

Cylindrical commutators of a 12V auxiliary motor were made according to prior art and according to the invention.

The commutators according to prior art were made by machining tubular sections made of unannealed copper.

The commutators according to the invention were made with powder of electrolytic copper and natural graphite according to the manufacturing process of Example 1, with the exception of the following points. The compression pressure was 220 MPa. The sintering temperature was 700° C. and the sintering lasted 4 h. The orientation of the graphite flakes was comparable to that of Example 1.

The life-span tests were on a test bench under actual conditions of use. In all cases, the current was 23.0 A, the voltage was 11.75 V and the rotating speed was 2,500 rpm. The operation of the motor was continuous during the trial.

The trials were performed with grade LCL C7273 metal-graphite brushes compressed along the tangential direction t. The brushes had a cross section of 8 mm×9 mm and a usable length of 10 mm.

The results obtained were collected in Table II. The notation was the same as that of Example 1. The life-span corresponds to the time elapsed from when the motor was started up and the first defect linked to complete wear of one of the brushes and/or one of the commutators.

Case 1 concerns the commutators made according to prior art. Cases 2 and 3 correspond to commutators according to the invention. Each case corresponds to 3 trials on different motors.

TABLE II

| ① Cas | ② % Cu | ③ % C | ④ Rho | ⑤ R | ⑥ D | ⑦ Durée de via |
|---|---|---|---|---|---|---|
| 1- | 100 | 0 | 1,0 | >1 | 8,9 | 1490 h |
| 2- | 95 | 5 | 2,1 | 0,4 | 7,7 | 2760 h |
| 3- | 93 | 7 | 2,7 | 0,3 | 6,9 | 3300 h |

Key:
① Case
② % Cu
③ % C
④ Rho
⑤ R
⑥ D
⑦ Life-span

These results show that the life-span is clearly greater than 1.500 h for the commutators according to the invention.

Example 3

Cylindrical commutators of a 1.000 W. 230 V. vacuum cleaner motor were made according to prior art and according to the invention.

The commutators according to prior art were made of an assembly of individual bars obtained by machining from a drawn section of OFHC copper.

The commutators according to the invention were made with electrolytic copper and natural graphite powder according to the manufacturing process of Example 1, with the exception of the following points. The compression pressure was 240 MPa. The sintering temperature was 900° C. and the sintering time was 2.5 h. The orientation of the graphite flakes was comparable to that of Example 1.

The life-span tests were performed on a test bench under actual conditions of use. In all cases, the current was 5 A and the rotating speed was 25.000 rpm. The motor was put into operation on a cyclical basis, i.e., stopped for 30 sec and ran for 30 sec, during the entire test.

The tests were carried out with LCL A149 grade carbon-graphite brushes compressed along the tangential direction t. The brushes had a cross section of 6.3 mm×11.3 mm and a usable length of 20 mm.

The results obtained are collected in Table III. The notation is the same as that of Example 1. The life-span corresponds to the time elapsed from the start-up of the motor and the first failure linked to complete wear of one of the brushes and/or one of the commutators.

Case 1 concerns the commutators made according to the prior art. Cases 2 and 3 correspond to commutators of the invention. Each test corresponds to 3 tests on different motors.

TABLE III

| ① Cas | ② % Cu | ③ % C | ④ Rho | ⑤ R | ⑥ D | ⑦ Durée de via |
|---|---|---|---|---|---|---|
| 1- | 100 | 0 | 1,0 | >1 | 8,9 | 600 h |
| 2- | 98 | 2 | 2,1 | 0,3 | 7,9 | 1210 h |
| 3- | 95 | 5 | 2,1 | 0,4 | 7,0 | 1360 h |

Key:
① Case
② % Cu
③ % C
④ Rho
⑤ R
⑥ D
⑦ Life-span

Relative increases of the life-span are therefore observed in the same proportions as for the auxiliary motor of Example 2.

We claim:

1. A rotating element of an electrical machine, wherein
   said element comprises one or more rotating electrical contact parts,
   said rotating element having an axis of symmetry, and wherein
   each said contact part is made of a sintered copper-graphite composite material containing between 90 and 98% copper or copper alloy by weight,
   said graphite being in the form of flakes,
   said flakes being oriented with respect to said axis of symmetry such that the main axis P of more than 50% of said graphite flakes is inclined at less than 45° with respect to said axis of symmetry, the ratio Rho of resistivity rho ||/rho ⊥ being greater than 1.2 and the ratio R of bending strength R ||/R ⊥ being less than 0.8, where || designates the direction parallel to said axis of symmetry and ⊥ the perpendicular direction,
   said composite having a specific gravity of between 6.5 and 8.5.

2. Rotating element according to claim 1, wherein the graphite is of natural origin.

3. Rotating element according to claim 1, wherein the graphite flakes have a maximum size of less than 200 μm and at least 90% of the flakes have a maximum dimension lower than 100 μm.

4. Manufacturing process for a rotating electrical contact part made of a sintered copper-graphite composite material containing between 90 and 98% copper or copper alloy by weight,
   said graphite being in the form of flakes,
   said flakes being oriented with respect to said axis of symmetry such that the main axis P of more than 50% of said graphite flakes is inclined at less than 45° with respect to said axis of symmetry, the ratio Rho of resistivity rho ||/rho ⊥ being greater than 1.2 and the ratio R of bending strength R ||/R ⊥ being less than 0.8, where || designates the direction parallel to said axis of symmetry and ⊥ the perpendicular direction,
   said composite having a specific gravity of between 6.5 and 8.5 comprising:
   preparing a mixture of graphite powder, copper or copper-alloy powder and at least one solid lubricant,
   forming a raw casting by cold axial compression of the mixture in a mold, in such a way that the axis of compression coincides with the axis of symmetry of the aforesaid part, sintering the raw casting under a reducing atmosphere.

5. Manufacturing process according to claim 4, wherein the copper or copper-alloy powder has an irregular surface morphology.

6. The process of claim 5, wherein said powder has a dendritic surface morphology.

7. Manufacturing process according to claim 4, wherein the copper is of electrolytic origin.

8. Manufacturing process according to claim 4, wherein the maximum size of the copper powder is less than 200 μm and at least 90% of the copper powder has a maximum size of less than 100 μm.

9. Manufacturing process according to claim 4, wherein the proportion of solid lubricant is less than 5% by weight of said mixture.

10. Manufacturing process according to claim 4, wherein the solid lubricant is a stearate.

11. Manufacturing process according to claim 4, wherein the compression pressure is between 150 and 350 MPa.

12. Manufacturing process according to claim 4, wherein the sintering temperature is between 500° and 1,050° C.

13. Manufacturing process according to claim 4, wherein the sintering temperature is between 700° and 900° C.

14. Manufacturing process according to claim 4, wherein the length of time sintering is maintained is between 1 and 5 h.

15. Manufacturing process according to claim 4, wherein electrical conductors are sealed in the rotating electrical contact part at the time of compression.

16. Manufacturing process according to claim 4, wherein at least one electrical connection conductor is fastened to the rotating electrical contact part by axial compression of the mixture around a connection conductor at the time of compression.

17. An assembly of rotating contact parts comprising a support part made of an insulating material and rotating contact parts wherein said rotating contact parts are made of a sintered copper-graphite composite material containing between 90 and 98% copper or copper alloy by weight, said graphite being in the form of flakes, said flakes being oriented with respect to said axis of symmetry such that the main axis P of more than 50% of said graphite flakes is inclined at less than 45° with respect to said axis of symmetry, the ratio Rho of resistivity rho ||/rho ⊥ being greater than 1.2 and the ratio R of bending strength R ||/R ⊥ being less than 0.8, where || designates the direction parallel to said axis of symmetry and ⊥ the perpendicular direction, said composite having a specific gravity of between 6.5 and 8.5.

18. Assembly according to claim 17, further comprising at least one electrical connection part fastened to each contact part.

19. Manufacturing process for the assembly according to claim 18, wherein the connection part or parts are fastened to the rotating contact parts by axial compression of a mixture of graphite, powder, copper or copper alloy powder and at least one solid lubricant around said at least one connection part.

20. Manufacturing process according to claim 17, further comprising the fabrication of an initial part of a conductive material, the axial compression of a mixture of graphite powder, copper or copper alloy powder and at least one solid lubricant around one part of this initial part and electrical isolation between the rotating contact parts.

21. Electrical machine, comprising an assembly according to claim 17.

22. Electrical machine, comprising at least one rotating electrical contact part wherein said at least one part is made of a sintered copper-graphite composite material containing between 90 and 98% copper or copper alloy by weight, said graphite being in the form of flakes, said flakes being oriented with respect to said axis of symmetry such that the main axis P of more than 50% of said graphite flakes is inclined at less than 45° with respect to said axis of symmetry, the ratio Rho of resistivity rho ||/rho ⊥ being greater than 1.2 and the ratio R of bending strength R ||/R ⊥ being less than 0.8, where || designates the direction parallel to said axis of symmetry and ⊥ the perpendicular direction, said composite having a specific gravity of between 6.5 and 8.5.

23. An electrical contact part made of a sintered copper-graphite composite material containing between 90 and 98% copper or copper alloy by weight, said graphite being in the form of flakes, said flakes being oriented with respect to said axis of symmetry such that the main axis P of more than 50% of said graphite flakes is inclined at less than 45° with respect to said axis of symmetry, the ratio Rho of resistivity rho ||/rho ⊥ being greater than 1.2 and the ratio R of bending strength R ||/R ⊥ being less than 0.8, where || designates the direction parallel to said axis of symmetry and ⊥ the perpendicular direction, said composite having a specific gravity of between 6.5 and 8.5.

24. The part of claim 23, wherein said graphite is of natural origin.

25. The part according to claim 23, wherein the graphite flakes have a maximum size of less than 200 μm and at least 90% of the flakes have a maximum dimension lower than 100 μm.

* * * * *